3,453,868
SPECIFIC GRAVITY MEASURING SYSTEM FOR INTERFACE DETECTION
Charles S. Williams, Jr., Houston, Tex., assignor to The Texas Pipe Line Company, Houston, Tex., a corporation of Texas
Filed June 28, 1966, Ser. No. 561,165
Int. Cl. G01n 9/26
U.S. Cl. 73—32                                                    1 Claim

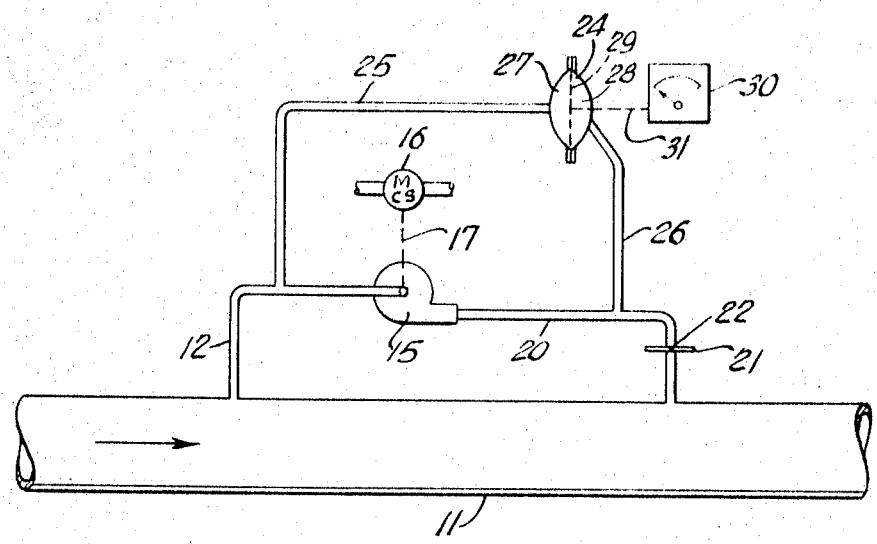

ABSTRACT OF THE DISCLOSURE

A pipeline fluid interface detector. It employs a centrifugal pump that carries fluid from the pipeline and is driven at a constant speed. There is means to measure the differential pressure across the pump, and an indicating meter to show changes in specific gravity which in turn indicate interfaces between fluids in the pipeline.

---

This invention concerns pipe line operations, in general. More specifically, it deals with a method and system for making determinations of the specific gravity of fluid flowing in a pipe line. Of course, such determinations can be utilized to reflect gravity of the liquid for interfacial detection, for process control gravity readings and for other such applications.

While there are various instruments presently employed or available for use in pipe line operations which will provide indications of specific gravity or related characteristics of pipe line fluid (in order to make determinations for detecting interfaces between batches of different fluids) such prior equipment is subject to various drawbacks and limitations. This is largely on account of the available instruments being affected by build-up of accumulated solids, e.g., paraffin or other deposits which render the indications inaccurate.

Consequently, it is an object of this invention to provide a system and method that is simple and yet accurate while not being subject to the drawbacks of the prior equipment mentioned above.

Briefly, the invention concerns a method applicable to pipe line operations that is for detecting changes in specific gravity of the fluid flowing in the line. The method comprises the steps of subjecting at least some of said fluid to centrifugal pumping, and maintaining said centrifugal pumping at a constant speed. The method also comprises measuring the pressure differential between the input and output of the fluid subjected to said centrifugal pumping. It follows that the said measurement of pressure differential is directly proportional to the specific gravity of said fluid.

Again briefly, the invention concerns pipe line operations, and more specifically relates to a system for detecting changes in specific gravity of the fluid flowing in the line. The system comprises in combination a means for subjecting at least part of said fluid to centrifugal pumping, and a means for maintaining said centrifugal pumping at a constant speed. The system also comprises means for measuring the pressure differential between the input and output of the fluid subjected to said centrifugal pumping, and means for indicating said pressure differential in terms of the specific gravity of said fluid.

The foregoing and other objects and benefits of the invention will be more fully set forth below in connection with the best mode contemplated by the inventor of carrying out the invention, and in connection with which there are illustrations provided in the drawings, wherein:

The figure of drawings shows a schematic illustration of a system in accordance with a preferred combination of apparatus that comprises the invention and that represents one schematic embodiment of apparatus for carrying out the method according to the invention.

Referring to the figure of drawings, it will be observed that there is illustrated a section of pipe line 11 through which fluids being carried are flowing. In order to determine the specific gravity of such fluid, so that interfaces between different fluids may be readily detected without delay, there is a pipe 12 that is connected to the pipe line 11 (preferably at right angles thereto) which connects to the inlet side of a centrifugal pump 15.

Centrifugal pump 15 is schematically indicated. It may in fact be a centrifugal pump having any feasible design with one or more stages. However, it must act upon the principle of centrifugal force in providing a pumping action. The pump 15 will have a characteristic in accordance with centrifugal pumps generally, such that when it is driven at a constant speed it will build up a constant head regardless of the fluid being pumped.

The centrifugal pump 15 is driven at a constant speed by a constant speed motor 16 that is schematically illustrated by a conventional symbol. The mechanical connection between motor 16 and the pump 15 is indicated by a dashed line 17 in the drawing.

On the output side of pump 15 there is pipe 20 that connects the outlet of the pump 15 to the pipe line 11 at a point spaced a short distance from the point where pipe 12 connects to the pipe line. Inserted into the pipe 20 at any convenient location therealong there is an orifice plate 21 having an orifice 22 therein that is designed to reduce the flow through pump 15 in order to have it operating close to its cut-off head. This will maintain a constant head irrespective of minor changes in rates of flow through the pump.

There is a pressure differential measuring instrument 24 that is connected to the inlet and outlet sides of centrifugal pump 15 by small diameter pipes 25 and 26 respectively, as illustrated. This pressure differential instrument 24 may take various forms and is schematically indicated as having a diaphragm 29 that separates internal chambers 27 and 28 which are connected to pipes 25 and 26 respectively. With this structure, the diaphragm will be flexed one way or the other in direct proportion to the difference in pressure between the fluids in pipes 25 and 26 which, of course, are substantially the same as the pressures on the inlet and outlet sides of centrifugal pump 15.

In order to have an indication of the pressure differential that is measured by the diaphragm 29, there is an indicating meter 30 that is schematically illustrated. This meter 30 is connected for actuation by the diaphragm 29 by whatever structure is feasible for the particular instruments employed. The latter is indicated in the illustration of the drawings by a dashed line 31.

OPERATION

The system operation may be briefly described with specific reference to the illustration of the drawings, as follows:

In order to determine continuously specific gravity of fluid in the pipe line 11, some fluid is diverted through the input pipe 12. Such fluid will be drawn into the pipe 12 by the pumping action of centrifugal pump 15. This fluid flows from the outlet of the pump through pipe 20 and the orifice 22 back to the pipe line 11.

Because the pump 15 is being driven at a constant speed by motor 16 and on account of the characteristics of centrifugal pumps, the pump will develop a constant head between its inlet, i.e., pipe 12 and its outlet, i.e., pipe 20. However, the differential pressure that is thus created between the inlet and outlet of the pump will vary depending upon the specific gravity of the fluid at any given time.

These conditions may be expressed mathematically by the equation $$\Delta P = K \times SG$$

where $\Delta P$ stands for the differential pressure, K stands for a constant that is determined by the pump characteristics and SG stands for specific gravity of the liquid being pumped.

It will be observed that while the fluid that is being pumped by centrifugal pump 15 is flowing through the above described path, i.e., pipe 12 to the inlet of pump 15 and then through pipe 20 and orifice 21 back to the pipe line from the outlet of pump 15; the pressure of the fluid on the inlet side of the pump is being applied over pipe 25 to one side of the pressure differential instrument 24. At the same time, the pressure on the outlet side of pump 15 is being applied over pipe 26 to the other side of the pressure differential instrument 24. Therefore, the indications of meter 30 (that are directly controlled by the position of the pressure differential diaphragm 29) will be an indication that is in direct proportion to the pressure differential. Since the pressure differential thus indicated is directly proportional to the specific gravity of the fluid being pumped, changes in specific gravity caused by passage of an interface between different products in the pipe line will be immediately and clearly indicated without being subject to loss of sensitivity because of paraffin or BS&W deposits or both.

Thus, it will be clear that by carrying out this method of measuring specific gravity of the fluid in the pipe line 11, a fast acting and accurate determination of the passage through the pipe line of an interface between two fluids having different specific gravity, may be had. This determination is free from the drawbacks or inaccuracies inherent in equipment that has been employed heretofore, for making such determination.

METHOD STEPS

In carrying out a method in accordance with this invention the following manipulative steps will be employed:

(1) Subjecting the fluid to be measured to centrifugal pumping. It will be clear that this step may be carried out by a wide variety of different structures and types of apparatus that would no necessarily be the equivalent one for another.

(2) Maintaining the centrifugal pumping at a constant speed. In this step the important aspect is that of constant speed drive for the centrifugal pump, and it will be clear that various types of motor might be employed. For example, an electric motor or a hydraulic or pneumatic motor might be employed depending upon what is most feasible to employ in a given instance. Of course, other and diverse types of motor might be used such as an internal combustion engine or the like.

(3) Measuring the pressure differential between the input and output of the fluid subjected to centrifugal pumping. It is to be noted that this measurement may be carried out by a wide variety of instruments that are not necessarily mere equivalents of one another. For example, the pressure differential might be measured by taking separate pressure reading on the input and output sides of the pump 15 and then calculating the difference between such readings. Thus the apparatus employed does not matter, so long as the desired pressure differential is measured. It will be observed that should the pressure differential measurement be of the type that makes it feasible to do so, there may be a meter or similar indicator to provide visual indication and/or a record of such measurement, if desired.

In the foregoing manner the change in specific gravity of the fluid flowing in pipe line 11 will be rapidly and positively indicated by carrying out the method, so that interface determination between batches of different fluids in the pipe line will be positive and rapid without being subject to inaccuracies and maintenance problems.

While particular embodiments of the invention have been described above in considerable detail in accordance with the applicable statutes, this is not to be taken as in any way limiting the invention but merely as descriptive thereof.

I claim:

1. In pipe line operations, a system for detecting changes in specific gravity of the fluid flowing in the line, comprising in combination means for subjecting at least part of said fluid to centrifugal pumping, means for maintaining said centrifugal pumping at a constant speed, means for measuring the pressure differential between the input and output of the fluid subjected to said centrifugal pumping; and a meter for visually indicating said pressure differential in terms of the specific gravity of said fluid in order to show passage of an interface between two fluids in said pipe line.

References Cited

UNITED STATES PATENTS

| | | | |
|---|---|---|---|
| 1,677,835 | 7/1928 | Linderman | 73—32 X |
| 2,400,413 | 5/1946 | Hersey | 73—32 X |
| 2,406,179 | 8/1946 | Walsh et al. | 73—32 X |
| 3,028,748 | 4/1962 | Frantz | 73—32 |

FOREIGN PATENTS 674,247  10/1929  France.

RICHARD C. QUEISSER, *Primary Examiner.*

E. D. GILHOOLY, *Assistant Examiner.*